M. A. POPKESS.
APPARATUS FOR PRODUCING PAVING MATERIALS.
APPLICATION FILED JAN. 24, 1918.
1,373,205.
Patented Mar. 29, 1921.
2 SHEETS—SHEET 2.
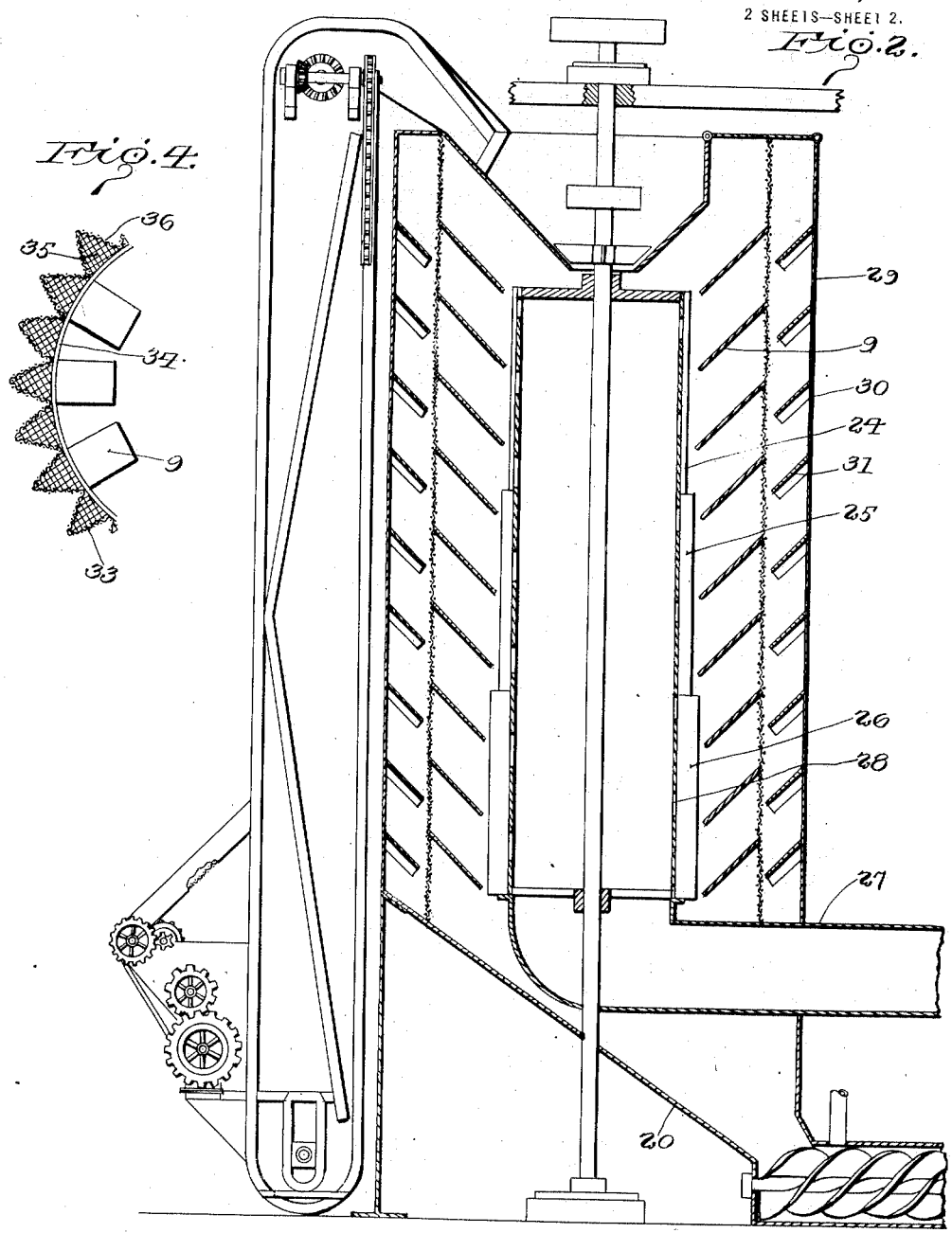

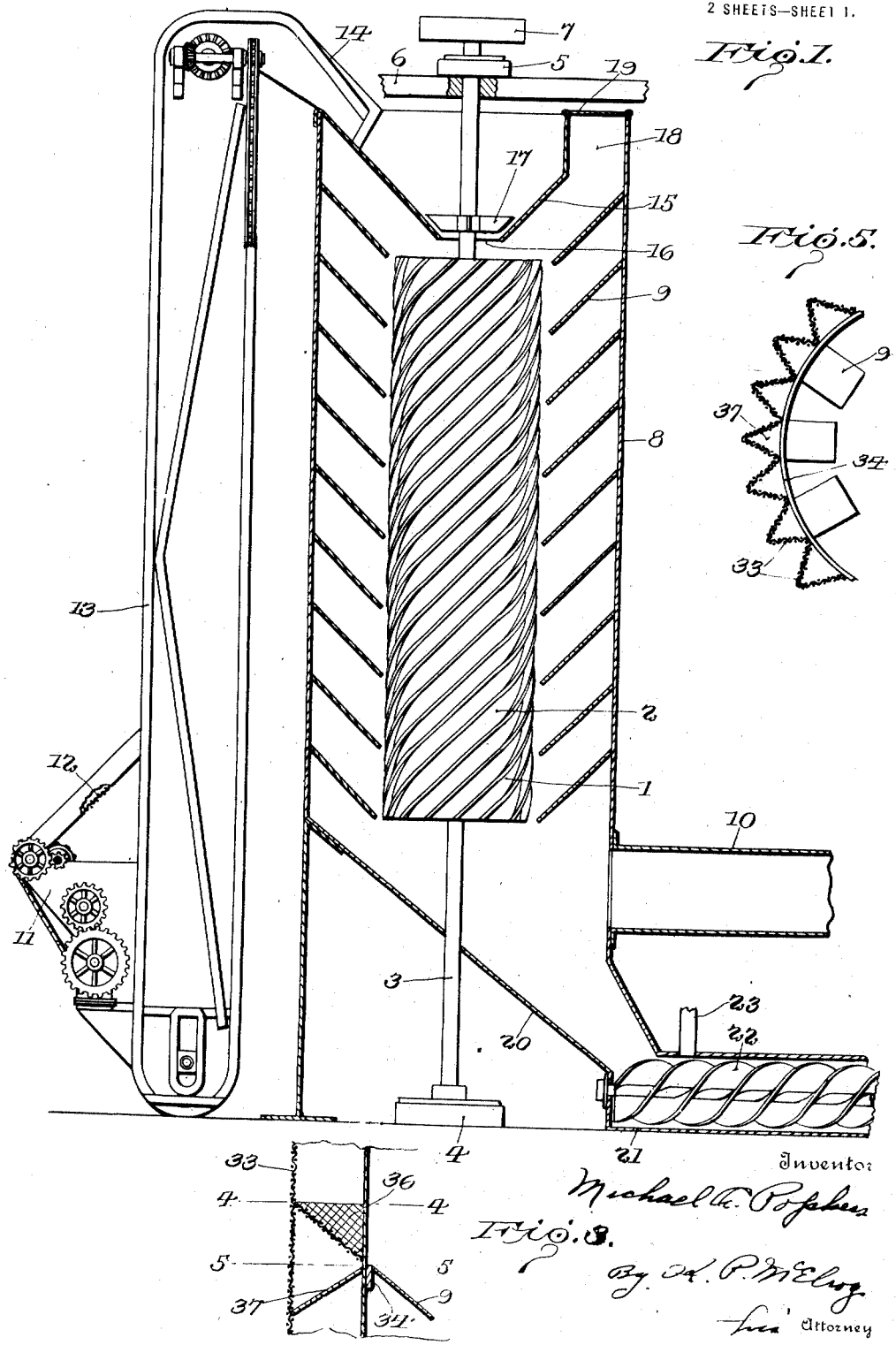
M. A. POPKESS.
APPARATUS FOR PRODUCING PAVING MATERIALS.
APPLICATION FILED JAN. 24, 1918.
1,373,205.
Patented Mar. 29, 1921.

UNITED STATES PATENT OFFICE.

MICHAEL A. POPKESS, OF KANSAS CITY, MISSOURI, ASSIGNOR TO BITUMINIZED ROAD COMPANY, A CORPORATION OF ARIZONA.

APPARATUS FOR PRODUCING PAVING MATERIALS.

1,373,205. Specification of Letters Patent. Patented Mar. 29, 1921.

Application filed January 24, 1918. Serial No. 213,589.

*To all whom it may concern:*

Be it known that I, MICHAEL A. POPKESS, a citizen of the United States, residing at Kansas City, in the county of Jackson and State of Missouri, have invented certain new and useful Improvements in Apparatus for Producing Paving Materials, of which the following is a specification.

This invention relates to apparatus for producing paving materials and it comprises a machine having a rotating pulverizer, best arranged perpendicular, or nearly so, and provided with blades to disintegrate or comminute the earthy material, a surrounding casing or hood having a plurality of blades or baffle plates inclined toward the pulverizer, and adapted to return the earthy material to the pulverizer for further treatment, and to progressively feed the material toward the outlet end of the machine, said casing being, in some instances, perforated to permit the fine dust to pass out of the zone of treatment and collected, means for conveying material into the machine to be treated, means for passing heated gases into the machine, and means for mixing the dust with a liquid or liquefied binder; all as more fully hereinafter set forth and as claimed.

In a prior Patent No. 1,008,433 patented November 14, 1911, I have described a process of producing paving material in which earthy material is disintegrated and mixed with a binder to form a dense, homogeneous, yet malleable product. This material is used to form roadways. In a later Patent No. 1,240,481, patented Sept. 18, 1917, I have described and claimed another process of producing roadways, in which earthy material in a cold and damp state is mixed with a binder, and then passed through a disintegrator, and also a machine in which earthy material is reduced to a fine dust-like condition, sprayed with a binder, and then the entire material is impacted to cause a thorough mixture.

In a copending application Serial No. 155,282, filed March 16, 1917, I have shown and described another machine for making paving material in which the material is pulverized, and then passed through a mixer together with a predetermined proportion of liquid or liquefied asphalt.

In each of the machines referred to, the pulverizer is shown as a horizontal drum. In a machine of this character, it is necessary to provide means for feeding the material through the machine from the inlet end to the outlet. As shown, the means for feeding the material comprises spiral plates or guides carried by the outer casing which is a revolving drum. The provision of a relatively large number of revolving parts is comparatively expensive, and, while machines of these types are very satisfactory, they are often, too expensive to be installed for a small piece of work.

In the present invention, I have produced a machine having only one revolving part; the pulverizer. I construct the machine perpendicular instead of horizontal and utilize the force of gravity to feed the earthy material through the machine. A machine of this character is comparatively inexpensive, and it produces an excellent pavement. It may be advantageously employed for small "jobs" where the cost of installation or transportation of a larger machine would be relatively large.

In the present method of producing paving material by my improved machine, the soil, loam, clay or the like, is repeatedly subjected to the action of a pulverizer, until it is reduced to a fine dust. The material is subjected to the action of the pulverizer to the maximum degree, the entire circumference and length of the pulverizer acting on the material in its course through the machine. The material is continuously in a state of agitation. The partly reduced earth is collected by shelves or baffle plates as it leaves the pulverizer, and is returned for further treatment by gravity, at the same time being fed through the machine or toward the outlet end.

In the present apparatus, I employ a revolving pulverizer, arranged vertically or perpendicularly, the pulverizer being provided with blades to comminute or disintegrate the material, a surrounding casing or hood having a series of inclined blades or baffle plates upon which the earthy material collects when it leaves the pulverizer, said inclined plates being arranged to permit the partly disintegrated earth to return to the pulverizer for further treatment, and, at the same time, to pass through the machine, that is, toward the outlet end of the machine. In some instances, the casing is made of perforated metal or screen, and the dust is allowed to pass through the perforated walls as fast as it is formed. In this construction a casing of solid metal, or other material surrounds the screen or perforated hood, and the dust is collected in this casing and delivered toward the outlet end of the pulverizer. The machine further comprises means for delivering heated gases into the pulverizer, and means for mixing the dust with a bituminous binder.

The heated gases are best passed upwardly through the machine, following the natural tendency. This upward movement is, however, interrupted by the inclined plates. These plates are arranged in staggered relation, and they cause the gases to travel in a zigzag course. The movement of the pulverizer also tends to whirl the gases so that the flow is slow, so to speak, and the greatest benefits are obtained from the gases.

In the accompanying drawings I have shown several embodiments of this invention. In this showing—

Figure 1 is a vertical sectional view of one type of machine in which the rotary pulverizer is surrounded by a single stationary casing;

Fig. 2 is a similar view of a slightly modified construction in which a pulverizer is surrounded by two casings, the inner casing having perforated walls;

Fig. 3 is a detailed view showing a type of screen wall construction which may be employed in lieu of the inner perforated casing of Fig. 2;

Fig. 4 is a horizontal sectional view taken on the line 4—4 of Fig. 3;

Fig. 5 is a similar view on the line 5—5 of Fig. 3, and

Fig. 6 is a detailed view of a portion of the outer casing shown in Fig. 2.

In the construction shown in Fig. 1, the pulverizer 1 is made in the form of a cylinder and is provided with spiral blades 2 upon its periphery. The pulverizer is mounted on a shaft 3 supported in a socket 4 at the base and a hanging bearing 5 at the upper end. The hanging bearing is supported by a brace bar 6 which may be secured to the frame work of the machine (not shown). The shaft is driven from a suitable source of power through drive wheel 7. The pulverizer is mounted within a casing 8 which is stationary. Inclined shelves or baffle plates 9 are mounted on the inner wall of the casing. These plates are best arranged in spiral courses extending from the top to the bottom of the casing and are placed in staggered relation, that is, in any vertical plane there will be a plate in one row and an opening or space in the next row, etc. The plates extend inwardly to a point very near to the periphery of the pulverizer. Pipe 10 is provided to convey heated gases or products of combustion into the interior of the machine.

The earth to be pulverized is delivered into a hopper 11 through an inclined screen 12. The material passes from the hopper to an elevator 13 which delivers it to a chute 14 emptying into a hopper 15 at the upper end of the casing. The construction of the feeding hopper and casing is clearly described in my co-pending application Serial No. 155,282, filed March 16, 1917, and a general description is deemed sufficient for the purposes of this disclosure.

The hopper (15) is formed at the upper end of the casing (8) and has an opening 16 located just above the pulverizer. A revolving arm 17 is carried by the main shaft above the opening just referred to. A stack 18 is provided for the exhaust of the heated gases. This stack may extend any suitable distance around the machine. The stack is provided with a damper 19 which may be in the form of hinged doors for regulating the opening.

A hopper 20 is arranged beneath the pulverizer and communicates with a mixer 21 having a worm or other mixing apparatus 22. Pipe 23 is provided for the admission of liquid or liquefied asphalt or other binder.

In the construction shown in Fig. 2 the pulverizer is provided with straight blades in place of the spiral blades shown in Fig. 1. These blades are made of different sizes, increasing in size toward the outlet end of the machine. As shown three sets of blades 24, 25 and 26 are employed. Pipe 27 is arranged to convey the heated gases or products of combustion into the interior of the pulverizer and openings 28 are formed in the pulverizer for the escape of the heated gases. These openings are advantageously increased in size toward the inlet end of the machine. The construction of the baffle plates (9) is the same as in Fig. 1, except that in this instance they are secured to a casing or hood 29. This hood is made of perforated metal or wire screen. The perforated wall is surrounded by an outer casing 30 which may be provided with inclined shelves 31 and 32 which are at right angles to the baffle plates (see Fig. 6).

The construction of the elevator and feeding hopper are the same as in Fig. 1 and the machine is also provided in this instance with a mixing apparatus and the means for feeding a binder to the mixing apparatus.

In the construction shown in Figs. 3, 4 and 5 the perforated casing is composed of a series of walls 33 arranged at an angle to each other and producing a substantially star shaped effect. The baffle plates may be secured to the casing by means of strips of metal 34 which are best arranged spirally of the casing. Extending into what may be termed, the points of the star beyond each baffle plate is a sheet of screen wire or perforated metal. As shown in Fig. 3 these plates are arranged in substantially the same inclined plane as the baffle plates, but each of them consists of two sections 35 and 36 which incline from the center line of the star toward the perforated walls. A plate of solid material 37 is arranged beneath the plates 35 and 36 and is best inclined outwardly, in the opposite direction from the baffle plate.

In the operation of the machine as described in Fig. 1 the earthy material to be pulverized is placed upon the screen 12. Rocks and large lumps of material will fall off of the screen to the ground and smaller lumps will fall through the screen to the bin or hopper 11. The material that passes into hopper 11 is conveyed by an elevator 13 to the chute 14 and passes into hopper 15. The rotating arm 17 strikes the material and scatters it around the hopper so as to give an even feed to the machine. The material passes through the opening 16 to the top of the pulverizer and is carried outwardly by centrifugal force to the first set of baffle plates 9. In its passage through the machine, the material slides down the baffle plates and strikes the pulverizer. It is disintegrated or comminuted by the blades 2 and is repeatedly thrown outwardly upon the baffle plates. In each instance the material will slide down the baffle plates and return to the pulverizer for further treatment. This process is continuous throughout its passage through the machine, the force of gravity being utilized to feed the material through the machine. In some cases the material will be disintegrated without the aid of heat, but if heat is desired to assist the disintegration, it is supplied through pipe 10 to the interior of the machine. The spiral blades form an induced draft which aggravates or increases the natural tendency of the heated gases to flow upwardly. The progress of the heated gases is retarded to a certain extent by the baffle plates which cause the gases to take a zigzag or staggered course, thereby coming in contact with all of the earthy material and thoroughly drying and heating it. The heated gases are exhausted through the stack 18. The flow of the gases may be regulated by the damper 19.

When the material reaches the lower end of the pulverizer it will be in a state of comminution or in other words it will be reduced to fine dust-like particles. This material is collected in the hopper 20 and passed through the mixer 21. Normally liquid asphalt, or semi-solid or solid asphalt which has been liquefied, is supplied to the mixer through pipe 23. The mixer is made of sufficient length to thoroughly mix the earthy material and the asphalt, or other binder, and the finished product is received at the outlet end of the mixer. The material is then ready for application to the roadway, or for use in making bricks, blocks or the like.

In the form shown in Fig. 2 the material is supplied to the pulverizer in the same manner. In this instance the pulverizer is provided with straight blades increasing in size toward the outlet end of the machine. The heated gases are conveyed into the interior of the pulverizer and flow upwardly and outwardly. The outward flow is caused by a draft created by the movement of the pulverizer. The gases flow from the pulverizer through the openings 28. The larger blades 26 are provided at the lower end of the pulverizer to off set the natural tendency of the gases to flow upwardly. The perforated wall, or wall formed of wire screen, provided in this construction is for the purpose of allowing the dust to be collected as fast as it is formed. In the performance of the process some of the earth will be thoroughly disintegrated in the upper part of the machine, and this may be collected or removed from the zone for further treatment. As the material is thrown from the pulverizer on to the inclined baffle plates, that portion of it which has been reduced to a dust will pass through the perforated wall 29 and will flow down the blades or shelves 31 and 32 to the hopper 20. After the dust is collected in the bin 20 it is sent through the mixer and mixed with the binder as heretofore described.

In the operation the form shown in Figs. 3 and 5 of the drawings, the material is collected on the baffle plates 9 and the dust passes through the screen plates 35 and 36 falling on the plate 37. As the plate 37 is inclined outwardly, it causes the dust to pass outwardly through the walls 33 on to the plates 31 and 32.

What I claim is:—

1. A paving machine comprising a revolving vertical pulverizing reel having blades on its periphery, means for feeding earthy material into the machine, and means for receiving the material as it leaves the pulverizing reel and repeatedly returning it for further treatment during its passage through the machine, the earthy material being fed through the machine from the inlet to outlet by gravity.

2. A paving machine comprising a revolving vertical pulverizing reel having blades on its periphery, means for feeding earthy material into the machine, a casing surrounding the pulverizing reel, inclined plates arranged upon the casing and adapted to receive the material as it leaves the pulverizing reel and to repeatedly return it to the pulverizing reel for further treatment, and means communicating with the outlet of the pulverizer for mixing the material with a binder.

3. A paving machine comprising a vertical casing, a revolving pulverizing reel within the casing having pulverizing blades on its periphery, means to introduce material at the top of the reel, means for receiving the material as it leaves the pulverizing reel and for repeatedly returning it to the blades for further treatment, and means to pass heated gases upwardly through the machine to dry said material and accelerate comminution thereof.

4. A paving machine comprising a vertical casing, a revolving pulverizing reel within the casing, means to introduce material at the top of the reel, means located near said pulverizing reel to collect pulverized material as fast as it is formed, means to feed the material through the machine and means to pass heated gases upwardly through the machine.

5. A construction as described in claim 3 wherein said means for receiving the material as it leaves the pulverizer comprise inclined plates, said plates being arranged to feed the material through the machine.

6. A construction as described in claim 3 wherein said means for receiving the material as it leaves the pulverizer comprise inclined plates, said plates being arranged to feed the material through the machine and said plates being arranged spirally.

7. A construction as described in claim 3 wherein said means for receiving the material as it leaves the pulverizer comprise inclined plates, said plates being arranged to feed the material through the machine, said inclined plates being arranged to retard the natural flow of the material.

8. A construction as described in claim 3 provided with means for distributing the material fed into the machine.

9. A construction as described in claim 3 having means for collecting the earthy material converted into the dust as fast as it is formed.

10. A construction as described in claim 3 having means for feeding the dust toward the outlet end of the machine after it has been collected.

In testimony whereof, I affix my signature hereto.

MICHAEL A. POPKESS.